W. B. MAIR.
INSTRUMENT FOR GAGING INTERNAL DIAMETERS.
APPLICATION FILED MAY 23, 1917.

1,273,641. Patented July 23, 1918.

Inventor:
W. B. Mair

Attorney.

UNITED STATES PATENT OFFICE.

WILLIAM BRUCE MAIR, OF BIRMINGHAM, ENGLAND.

INSTRUMENT FOR GAGING INTERNAL DIAMETERS.

1,273,641.　　　　　　Specification of Letters Patent.　　Patented July 23, 1918.

Application filed May 23, 1917. Serial No. 170,447.

*To all whom it may concern:*

Be it known that I, WILLIAM BRUCE MAIR, a subject of His Majesty the King of England, and resident of Birmingham, in the county of Warwick, Kingdom of England, have invented certain new and useful Improvements in Instruments for Gaging Internal Diameters, of which the following is a specification.

This invention relates to improvements in instruments for gaging internal and external diameters and it refers more particularly to gages of the kind described in the specification of my prior United States Patent No. 1,008,842, Nov. 14, 1911.

The primary object of the present invention is to provide such measuring instruments with improved means for insuring that the balls will be set square in relation to the axis of the hole or the distance to be gaged so that the instrument can be effectively used without exceptional operative skill being required.

The present invention is hereinafter described with reference to the accompanying drawings in which:—

Figure 3:
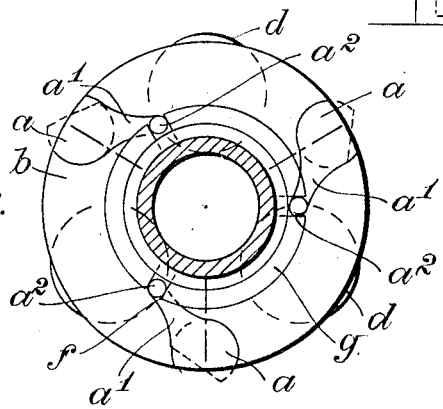
Figure 4:
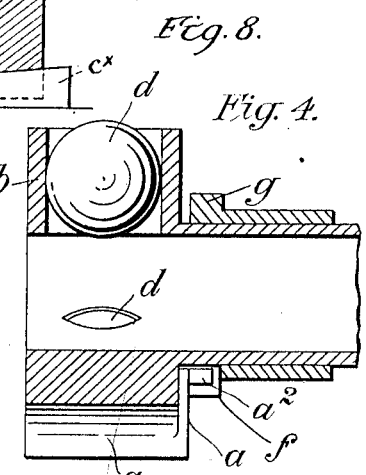
Figure 5:
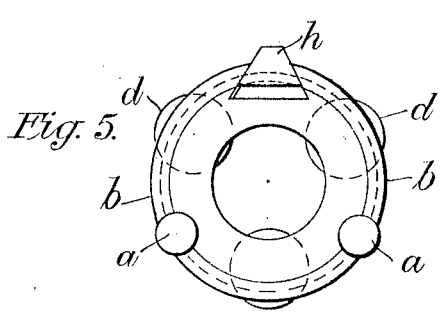
Figure 6:
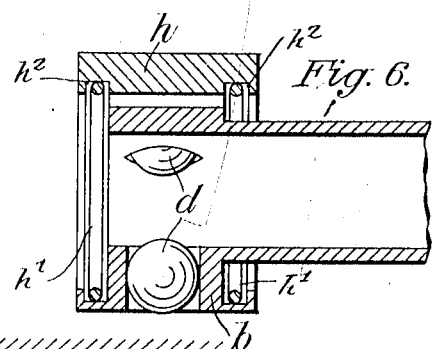
Figure 7:
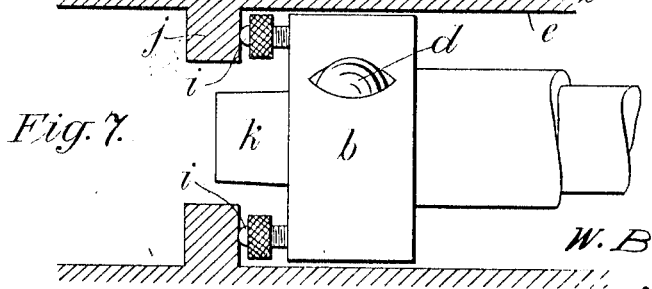

Fig. 3 is a face view of another form of the invention. Fig. 4 is a vertical section of same. Fig. 5 is a face view of still another form of the invention. Fig. 6 is a vertical section of same. Fig. 7 is a partial elevation and section of a further form of the invention. Fig. 8 is a detail section of a modified form of holding means.

Figure 1:
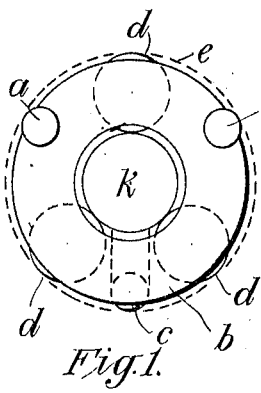
Figure 1 is an end elevation of a gage illustrating the improved means for holding the ball retainer in position.
Figure 2:
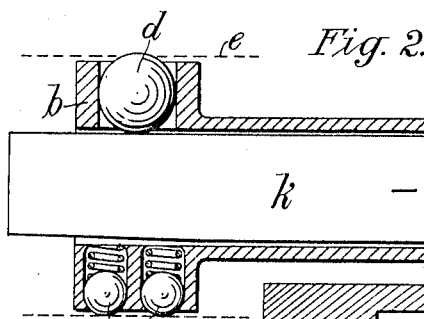
Fig. 2 is a sectional side elevation of said gage.

According to this invention I provide the ball retainer with adjustable means adapted to engage the side of the hole or piece being measured. In one very convenient arrangement these means may, as shown in Figs. 1 and 2, comprise two spaced apart and parallel seatings $a$ $a$ on the ball retainer $b$, which are adapted to be held lightly against the work by means of a pair of spring pressed members or balls $c$ or by means of an adjustable wedge $c^x$, as shown in Fig. 8, or other equivalent mechanical means. This will cause the ball retainer $b$ and therefore the balls $d$ therein to assume a position relative to the axis of the hole $e$ or to the other work such that the plane in which the balls lie will be square or nearly square with the axis of the hole. The two spaced seatings $a$ $a$ may if desired, be formed as shown by removably arranging two cylindrical members in axially parallel slots or grooves in the ball retaining sleeve. These longitudinal grooves for the seating members and the radial groove for the spring pressed ball or the like could conveniently be spaced around the circumference of the ball retaining ring at 120° apart.

The cylindrical members $a$ may be fixed as in Figs. 1 and 2 or they may be made rotatable and of irregular shape as shown in Figs. 3 and 4. The adjustment in the present instance is effected by providing the members $a$ with radial arms $a'$ and pins $a^2$ the latter of which are adapted to engage in slots $f$ in a rotatable ring $g$ which as it is rotated causes the members $a$ to be simultaneously adjusted as indicated by the dotted lines. In this arrangement preferably three rotatable members $a$ are provided whereas in the arrangement shown in Figs. 5 and 6 only two are provided as in Figs. 1 and 2, and they are kept up to the side of the hole $e$ or the like to be measured by means of a radially adjustable wedge shaped member $h$ which is pressed outwardly by means of a pair of split circular or spring rings in the manner indicated.

The springs $h'$ are housed in grooves in the recessed ends of the retainer $b$, and engage in transverse grooves $h^2$ in the inner face of the member $h$, as shown.

In another slightly modified method of carrying the present invention into effect as shown in Fig. 7, one or more adjustable or permanent seatings $i$ may be formed on the ball retaining ring $b$ for coöperation with a shoulder or shoulders $j$ formed internal to or external to the diameter of the piece $e$ being measured. This arrangement is quite effective as in the kind of gage above referred to it is not essential that the ball retainer $b$ shall be exactly concentric with the axis as the measuring plug $k$ is forced to assume a concentric position by reason of its contact with the radial balls $d$ as will be readily understood.

What I claim is:—

1. A device for gaging diameters comprising a sleeve in which a gage is inserted, a ball retainer on one end of the sleeve, a plurality of measuring balls of predetermined diameter mounted in the ball retainer and projecting slightly beyond the periphery of same to engage the surface to be gaged, and means movable with respect to and supported in the ball retainer and projecting slightly beyond the periphery thereof to engage the work to be gaged.

2. A device for gaging diameters comprising a sleeve in which a gage is inserted, a ball retainer on one end of the sleeve, a plurality of measuring balls of predetermined diameter mounted in the ball retainer and projecting slightly beyond the periphery of same to engage the surface to be gaged, a pair of elements on the ball retainer, said elements projecting beyond the periphery of the retainer, and spring actuated members projecting beyond the periphery of the retainer to center a gage in a piece of work.

3. A device for gaging diameters, comprising a sleeve, a ball retainer on the end of the sleeve, measuring balls in the ball retainer, and adjustable elements mounted on the retainer and adapted to be projected beyond the periphery of the latter to engage the surface of the work being gaged.

In testimony whereof I have hereunto signed my name.

W. BRUCE MAIR.